US011214447B2

(12) United States Patent
Lebender et al.

(10) Patent No.: US 11,214,447 B2
(45) Date of Patent: Jan. 4, 2022

(54) CONVEYOR BELT ARRANGEMENT OF A MATERIAL PROCESSING DEVICE

(71) Applicant: Kleemann GmbH, Göppingen (DE)

(72) Inventors: Frank Lebender, Gruibingen (DE); Tobias Geywitz, Rechtberghausen (DE); Reiner Köpf, Gingen an der Fils (DE)

(73) Assignee: Kleemann GmbH

( * ) Notice: Subject to any disclaimer, the term of this patent is extended or adjusted under 35 U.S.C. 154(b) by 0 days.

(21) Appl. No.: 16/334,511

(22) PCT Filed: Oct. 11, 2017

(86) PCT No.: PCT/EP2017/075926
§ 371 (c)(1),
(2) Date: Mar. 19, 2019

(87) PCT Pub. No.: WO2018/073067
PCT Pub. Date: Apr. 26, 2018

(65) Prior Publication Data
US 2021/0284459 A1    Sep. 16, 2021

(30) Foreign Application Priority Data
Oct. 18, 2016  (DE) ............... 10 2016 119 856.0

(51) Int. Cl.
*B65G 41/00*  (2006.01)
*B65G 39/071* (2006.01)
(Continued)

(52) U.S. Cl.
CPC ........... *B65G 41/005* (2013.01); *B65G 21/12* (2013.01); *B65G 21/2081* (2013.01);
(Continued)

(58) Field of Classification Search
CPC .............. B65G 41/005; B65G 39/071; B65G 21/2081; B65G 41/007; B65G 21/12; B65G 41/002; B02C 21/026; B02C 23/02
(Continued)

(56) References Cited

U.S. PATENT DOCUMENTS

| 3,675,762 | A | 7/1972 | Arndt |
| 3,802,022 | A | 4/1974 | Fleming |
| 6,186,338 | B1* | 2/2001 | Douglas ................. B02C 21/02 209/241 |
| 7,261,200 | B1* | 8/2007 | Kemper ................. A01D 17/00 198/581 |

(Continued)

OTHER PUBLICATIONS

PCT International Search Report in corresponding PCT/EP2017/075926, dated Jan. 3, 2018, 14 pages (not prior art).

*Primary Examiner* — Mark A Deuble
(74) *Attorney, Agent, or Firm* — Lucian Wayne Beavers; Patterson Intellectual Property Law, P.C.

(57) ABSTRACT

The invention relates to a conveyor belt arrangement of a material processing device having a conveyor belt (20) and a receiving and adjustment mechanism for adjusting the conveyor belt between a transport position and a working position. To this end, the conveyor belt is mounted on bearing elements (40, 60), which are rotatably connected to receiving elements (30, 50) of the receiving and adjusting mechanism. According to the invention, the receiving elements are each coupled to a pivot bearing each having a pivot axis (30.1, 50.1) for the pivotable attachment to the material processing device, and at least one bearing element is connected to the conveyor belt in a linearly adjustable manner, and/or between the conveyor belt and the pivot bearing of at least one receiving element, a compensating mechanism is provided, by means of which a spacing change between the bearing elements can be compensated for. The conveyor belt arrangement allows the simple adjustment of the conveyor belt of a material processing device between a working position and a transport position.

25 Claims, 8 Drawing Sheets

Figure 1:
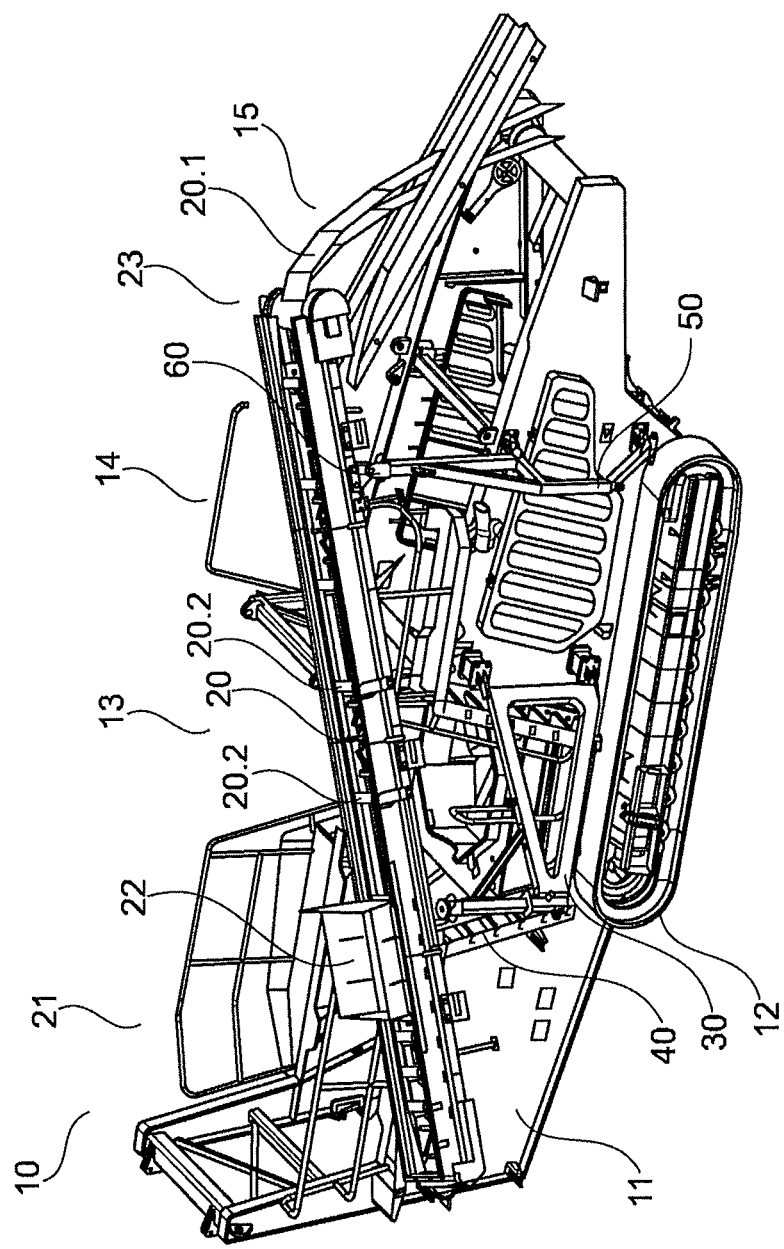

(51) Int. Cl.
*B65G 21/20* (2006.01)
*B65G 21/12* (2006.01)
*B02C 23/02* (2006.01)
*B02C 21/02* (2006.01)

(52) U.S. Cl.
CPC ......... B65G 39/071 (2013.01); B65G 41/002 (2013.01); B65G 41/007 (2013.01); *B02C 21/026* (2013.01); *B02C 23/02* (2013.01)

(58) Field of Classification Search
USPC ................................ 198/632, 538, 312–318
See application file for complete search history.

(56) References Cited

U.S. PATENT DOCUMENTS

| | | | | |
|---|---|---|---|---|
| 7,264,104 | B2* | 9/2007 | Heeszel | B02C 21/02 |
| | | | | 198/314 |
| 8,113,332 | B2* | 2/2012 | Devlin | B65G 21/14 |
| | | | | 198/313 |
| 8,746,434 | B2* | 6/2014 | Neufeld | A01C 15/003 |
| | | | | 198/312 |
| 11,078,024 | B2* | 8/2021 | Geywitz | B02C 23/02 |
| 2002/0179024 | A1 | 12/2002 | Anderson et al. | |
| 2009/0241484 | A1* | 10/2009 | Cullen | A01F 25/183 |
| | | | | 53/527 |
| 2010/0282568 | A1 | 11/2010 | Whyte et al. | |
| 2011/0318151 | A1 | 12/2011 | Sheehan et al. | |
| 2013/0134013 | A1 | 5/2013 | Borkgren | |
| 2014/0202835 | A1* | 7/2014 | Watters | B65G 21/14 |
| | | | | 198/812 |

* cited by examiner

CONVEYOR BELT ARRANGEMENT OF A MATERIAL PROCESSING DEVICE

The invention relates to a conveyor belt arrangement of a material processing device having a conveyor belt and a receiving and adjusting mechanism of the conveyor belt, wherein the conveyor belt has a charging region and an ejection region, wherein the conveyor belt is able to be pivotably fastened with the receiving and adjusting mechanism to the material processing device between a working position and a transport position, wherein the conveyor belt is mounted on at least two bearing elements of the receiving and adjusting mechanism and wherein the bearing elements are rotatably mounted indirectly or directly on one respective receiving element of the receiving and adjusting mechanism about rotational axes.

A material processing device having a conveyor belt is disclosed in EP 2 756 887 A1. The conveyor belt is pivotably fastened to the material processing device. To this end, the conveyor belt on the ejection side is located on a bar which is pivotably mounted about a vertically oriented axis. The conveyor belt is pivotably and fixedly connected to the transverse bar about a horizontally extending rotational axis. Thus both the lateral orientation of the conveyor belt relative to the material processing device and the inclination thereof may be adjusted. On the charging side, the conveyor belt is retained by an extendable support which is connected to the material processing device. The support is pivotably fastened to the material processing device about two axes located perpendicular to one another. Thus the support may be pivoted both in a horizontal and in a vertically extending plane. On the end side, the support is fixedly connected to the conveyor belt via a rotary bearing. The rotary bearing in this case is oriented transversely to the longitudinal extent of the conveyor belt. The arrangement makes it possible to fold up the conveyor belt onto the material processing device in a transport position and to orientate the conveyor belt in a working position so as protruding laterally from said material processing device. In this case, in the transport position the conveyor belt may be folded down on the end side and thus reduced in its length. A drawback is that for displacing the conveyor belt between its transport position and its working position and for adjusting the inclination of the conveyor belt, the length of the support has to be altered. The support, therefore, has to be designed to be extendable. This is mechanically complex and requires additional components, for example in the form of corresponding hydraulic cylinders. Moreover, the support has to span a long distance between the chassis of the material processing device and the bearing position of the conveyor belt on the charging side and thus forms a long lever. Due to the required adjustment of the length, a multi-axis supporting structure may be provided as a support which is connected at two spaced-apart retaining points to the chassis of the material processing device. Thus the forces, which act as a result of the weight force of the conveyor belt and the transported goods on the support, have to be absorbed by a single-arm lever arm on a rotatably designed retaining point on the chassis of the material processing device. The support and the bearing thereof on the chassis have to be configured to be correspondingly robust, wherein due to the long lever arm, however, the maximum load-bearing capacity of the conveyor belt is significantly limited in its receiving region. This limits, in particular, the applicability of the conveyor belt for loading the material processing device with heavy boulders and rocks.

It is the object of the invention to provide a conveyor belt arrangement of a material processing device having a conveyor belt and a receiving and adjusting mechanism of the conveyor belt, which permits a simple displacement and positioning of the conveyor belt between a transport position and a working position and at the same time permits a high load-bearing capacity of the conveyor belt.

The object of the invention is achieved by the receiving elements in each case being coupled to a pivot bearing by one respective pivot axis for the pivotable fastening to the material processing device and by at least one bearing element being connected in a linearly adjustable manner to the conveyor belt and/or that a compensating mechanism is provided between the conveyor belt and the pivot bearing of at least one receiving element, an alteration to the spacing between the bearing elements being able to be compensated thereby. In this case, within the meaning of the invention, a pivot bearing with the associated pivot axis is the bearing and/or the axis about which a receiving element is pivotable relative to the material processing device. Rotational axes within the meaning of the invention are axes about which the bearing elements are rotatable or pivotable relative to the receiving elements. By pivoting the receiving elements, the bearing elements coupled thereto are pivoted on one respective partial portion of a circular path about the respective pivot axis. The bearing elements may thus be folded onto the material processing device or folded away therefrom. As a result, the conveyor belt is correspondingly moved therewith. By pivoting the receiving element on the charging side, the charging region of the conveyor belt is pivoted away from the material processing device or folded onto said device. When folding out the receiving element on the charging side, at the same time the conveyor belt rotates such that the charging region is arranged so as to stand laterally away from the material processing device. The bearing element on the ejection side is preferably arranged spaced apart from the end on the ejection side of the conveyor belt. When pivoting out the end of the conveyor belt on the charging side, the end thereof on the ejection side thus moves over the material processing machine and may be accordingly positioned there. By pivoting the receiving element on the ejection side, the position of the ejection region of the conveyor belt may be altered relative to the material processing device. By the bearing element being connected in a linearly adjustable manner to the conveyor belt or the compensating mechanism, the receiving elements may be pivoted independently of one another. The alteration to the spacing of the bearing elements to one another which is effected thereby is compensated by the linearly adjustable bearing element or the compensating mechanism.

By the receiving elements which are pivotable independently of one another, it is possible to adjust separately both the charging region and the ejection region of the conveyor belt according to the respective conditions of use. For example, the charging region of the conveyor belt may be oriented toward the ejector of a further material processing device connected upstream, whilst the end of the conveyor belt on the ejection side is positioned above a main charging hopper of the material processing device. The material of the material processing device connected upstream is then transported via the conveyor belt to the main charging hopper, collected thereby and conveyed via a charging belt to a crusher of the material processing device.

The angular alterations of the receiving elements relative to the conveyor belt when folded in and/or out are compensated and thus made possible by the rotatable mounting of the bearing elements.

For adjusting the orientation of the conveyor belt, it is not necessary to adjust the length of a receiving element on which the conveyor belt is mounted via the bearing elements. Thus multi-axis receiving elements which mechanically have a high load-bearing capacity may be provided. Moreover, the receiving elements may be pivotably connected to the material processing device at two or more bearing points which are arranged spaced apart. As a result, large forces may be absorbed by the receiving elements and transferred to a chassis of the material processing device.

According to a preferred variant of the invention, it is provided that at least one bearing element is fixedly connected to the conveyor belt. The conveyor belt is thus retained in a linear manner. No additional fastening elements have to be provided in order to prevent inadvertent linear displacement of the conveyor belt. Thus the required length compensation when pivoting the receiving elements may be compensated by the at least one bearing element connected in a linearly adjustable manner to the conveyor belt.

In the working position of the conveyor belt, in order to arrange the charging region thereof so as to stand laterally away from the material processing device and the ejection region above the material processing device, it may be provided that the bearing element on the charging side which is arranged toward the charging region is pivotably arranged on a larger radius about the pivot axis on the charging side than the bearing element on the ejection side, which is oriented toward the ejection region, about the pivot axis on the ejection side. By pivoting out the receiving elements, therefore, the bearing element on the charging side may be positioned further laterally spaced apart from the material processing device than the bearing element on the ejection side. As a result, an obliquely extending orientation of the conveyor belt may be adjusted relative to the material processing device.

A freely moving linear adjustability of the conveyor belt relative to at least one bearing element may be achieved by the bearing element which is connected in a linearly adjustable manner to the conveyor belt having guide rollers facing the conveyor belt, the conveyor belt being mounted thereon.

As a result, the conveyor belt may be carried and laterally guided by the guide rollers having running surfaces on which the conveyor belt is mounted and/or by the guide rollers having flanges on which the conveyor belt is laterally guided.

In order to prevent the conveyor belt, for example, from being lifted from the bearing element, which is connected in a linearly adjustable manner to the conveyor belt, by the external action of force or in the case of a heavy load in an end region of the conveyor belt outside the region limited by the bearing elements, it may be provided that guide rails are at least partially arranged laterally opposing one another on the conveyor belt and that guide brackets are arranged on the bearing element which is connected to the conveyor belt in a linearly adjustable manner, said guide brackets at least partially encompassing the guide rails.

An adaptation of the guide brackets to different inclination angles of the conveyor belt may be implemented by the guide brackets being adjustable in terms of their angle relative to the bearing element about an axis extending transversely to the longitudinal extent of the guide rail. As a result, jamming of the guide rail and thus of the conveyor belt on the guide brackets with an altered inclination of the conveyor belt is reliably avoided.

An adjustment of the inclination of the conveyor belt is permitted by the conveyor belt being pivotably connected to the at least one bearing element which is connected fixedly to the conveyor belt, via an axis extending transversely to the rotational axes of the bearing elements.

When pivoting the receiving elements the angle thereof is altered relative to the conveyor belt, which is compensated by the rotatable mounting of the bearing elements. As a result, a freely moving and yet mechanically high load-bearing rotary bearing of the bearing elements may be achieved by a rotary bearing connection which is configured as a plain bearing being arranged between the bearing elements and the respective receiving element and/or by superimposed sliding disks being arranged between the bearing elements and the respective receiving element. The sliding disks are preferably produced from a material which has a low coefficient of friction relative to one another.

According to a preferred variant of the invention, it may be provided that the bearing elements are rotatably fastened indirectly or directly to one respective pivoting arm of one respective receiving element and that the spacing between at least one bearing element and an associated pivoting arm is able to be altered. Preferably, in this case the spacing between the at least one bearing element and the associated pivoting arm may be altered in the direction of the rotational axis of the bearing element. By such an alteration to the spacing, the angle of inclination of the conveyor belt may be adjusted. By an alteration to the angle of inclination, for example, the height of the charging region may be adapted to the ejection height of a conveyor belt of a material processing device connected upstream, the ejected material thereof being intended to be processed further. Moreover, the height of the ejection region of the conveyor belt may be adjusted relative to the material processing device.

A simple adjustment of the angle of inclination of the conveyor belt may be achieved by the spacing between the at least one bearing element and the associated pivoting arm being able to be altered by installing and dismantling at least one intermediate piece and/or by means of at least one actuator. The use of intermediate pieces in this case is cost-effective and results in a mechanically high load-bearing support of the conveyor belt. Actuators, for example in the form of hydraulic cylinders, permit a continuous adjustment of the spacing between the at least one bearing element and the associated pivoting arm and thus the inclination of the conveyor belt.

For pivoting the conveyor belt in and out by corresponding pivoting of the receiving elements, the bearing elements have to be rotatably connected to the receiving elements. In order to permit this with different angles of inclination of the conveyor belt, it may be provided that the rotary bearing connection is configured, when the intermediate piece is installed, between the at least one bearing element and the intermediate piece and, when the intermediate piece is dismantled, between the at least one bearing element and the associated pivoting arm. Preferably, the rotary bearing connections are of the same construction. As a result, the bearing element may be rotatably mounted without structural adaptation both on the intermediate piece and on the associated pivoting arm.

In order to pivot the receiving elements about the pivot axes thereof in a simple manner with a small amount of force expenditure, and thus to fold the conveyor belt in or out, it may be provided that on at least one receiving element at least one control element, in particular a linear actuator, and/or at least one chain which is adjustable in its length and/or at least one cable which is adjustable in its length and/or at least one pull/push rod which is adjustable in its length is arranged on at least one receiving element for pivoting the receiving element about the pivot axis. The linear actuator may, for example, be driven electrically, pneumatically or hydraulically. A chain may have a ratchet tightener by which the length of the chain may be adjusted and whereby large forces may be applied for adjusting the receiving elements. A pulley block may be associated with a cable, for example, in order to apply the forces required for adjusting the receiving elements. The pull/push bar may, for example, be designed in the form of a manually or hydraulically adjustable upper linkage. Advantageously, with such a pull/push rod or a linear actuator which is adjustable in its length, only one such control element is required in order to move the receiving element in both pivoting directions and to retain it in its desired pivoted position. When using a chain or a cable, which in each case are only effective in the pulling direction, in each case at least two such control elements are required which act in opposing directions on the respective receiving element.

The pivoting of the receiving elements and at the same time the rotation of the bearing elements for adapting the angle between the receiving elements and the conveyor belt, which is altered by the pivoting, may be permitted by the rotational axes of the bearing elements being oriented in the direction of (i.e. parallel to) the pivot axes of the receiving elements. Thus, when pivoting the receiving elements the bearing elements and the rotational axes thereof are pivoted about the pivot axes of the receiving elements. At the same time, the bearing elements are rotated about their rotational axes corresponding to the orientation of the conveyor belt connected thereto.

In order to prevent an inadvertent adjustment of the conveyor belt after the orientation has taken place, it may be provided that the pivoting movement of at least one receiving element is able to be blocked. To this end, for example, it may be provided that the at least one receiving element is able to be positioned onto a chassis of the material processing device via bolts. Preferably, the pivoting movement of the receiving element is able to be blocked both on the charging side and also on the ejection side.

A simple construction of the conveyor belt arrangement may be achieved by the bearing element on the charging side being connected to the conveyor belt in a linearly adjustable manner and/or by the spacing between the bearing element on the charging side and the pivoting arm on the charging side being able to be altered.

The compensating mechanism for compensating the alteration to the spacing between the bearing elements may be provided in a simple manner by at least one receiving element having a compensating joint connection by which a portion of the receiving element remote from the pivot bearing may be pivoted relative to a portion facing the pivot bearing. The at least one receiving element is thus able to be folded onto itself. Preferably a compensating pivot axis formed by the compensating joint connection is oriented in the same direction as the pivot axes of the receiving elements and the rotational axes of the bearing elements. The receiving element is thus pivoted about is pivot axis between the transport position and the working position, wherein the associated bearing element corresponding to the orientation of the conveyor belt rotates about its rotational axis. The length compensation takes place by folding in and/or folding out the receiving element on its compensating joint connection. As a result, the spacing between the pivot axis and the rotational axis of the receiving element and the bearing element is altered. When folding the receiving element in and/or out, the orientation of the portion of the receiving element remote from the pivot bearing alters relative to the portion facing the pivot bearing. By the same orientation of the pivot axis, the rotational axis and the compensating pivot axis, this alteration to the orientation of the portions of the receiving element taking place in opposing directions may be compensated by the rotary bearing and/or the pivot bearing. The compensating mechanism may be provided additionally or alternatively to a linearly adjustable fastening of the at least one bearing element on the conveyor belt.

According to a preferred embodiment of the invention, it may be provided that the linear adjustment of the at least one bearing element and/or the compensating mechanism is able to be blocked. For the blocking, a corresponding clamping or bolting may be provided. This may be effective, for example, between the guide rail and the guide brackets and/or on the compensating joint connection of the compensating mechanism. Advantageously, the receiving and adjusting mechanism may not be adjusted automatically when the conveyor belt is adjusted in its position and independently of the control element provided, when correspondingly blocked.

Figure 2:
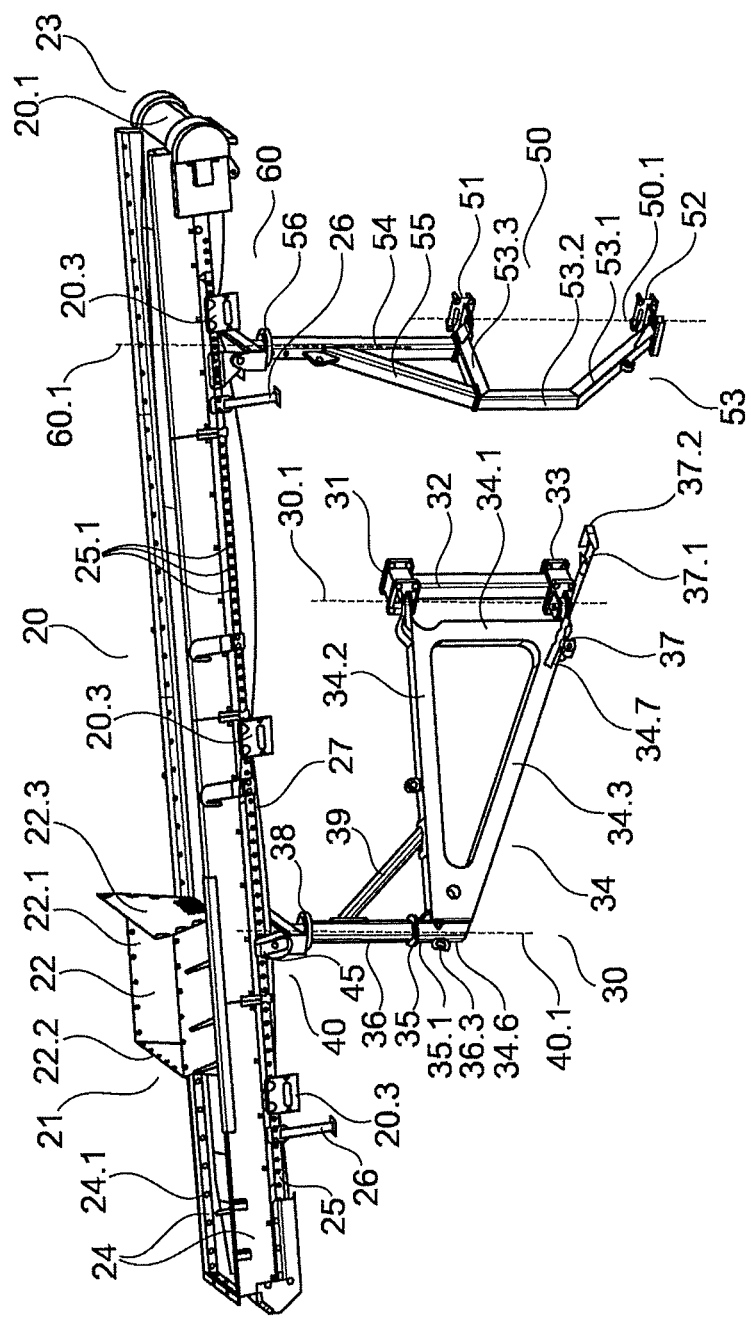
Figure 3:
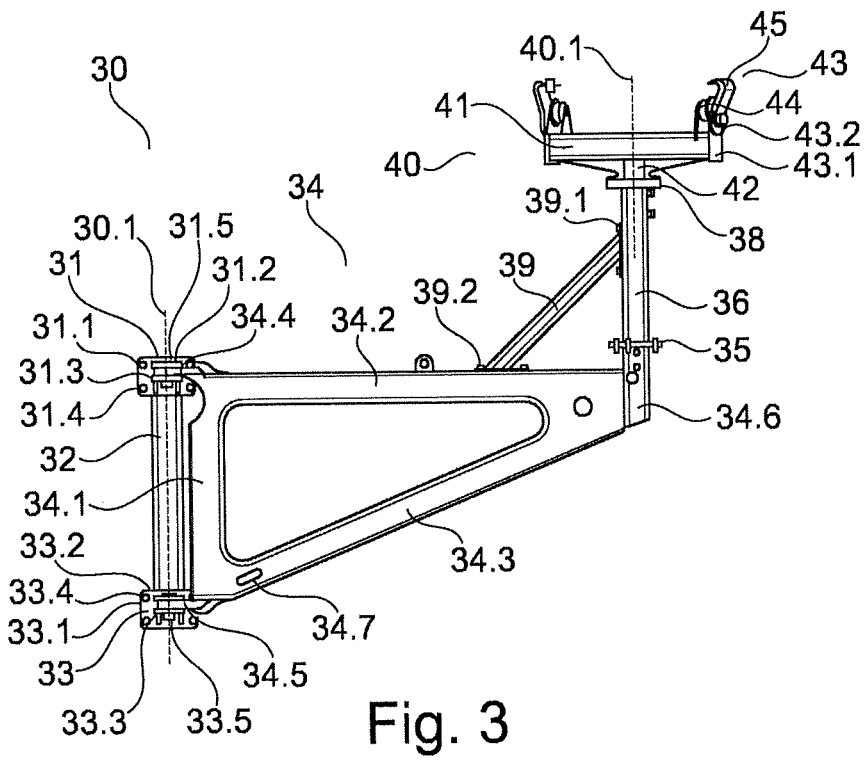
Figure 4:
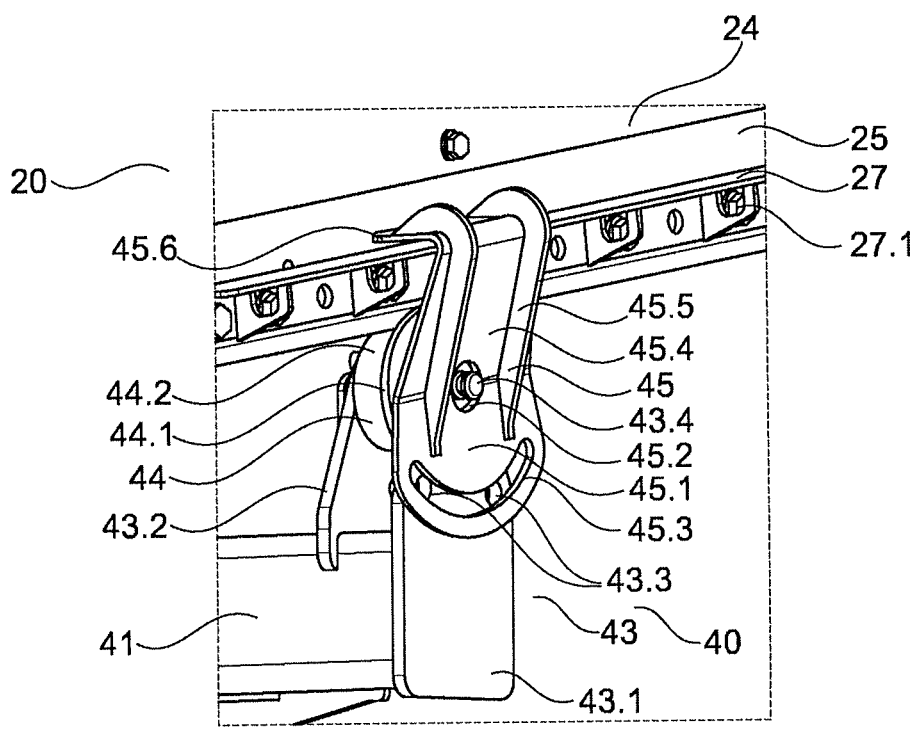
Figure 5:
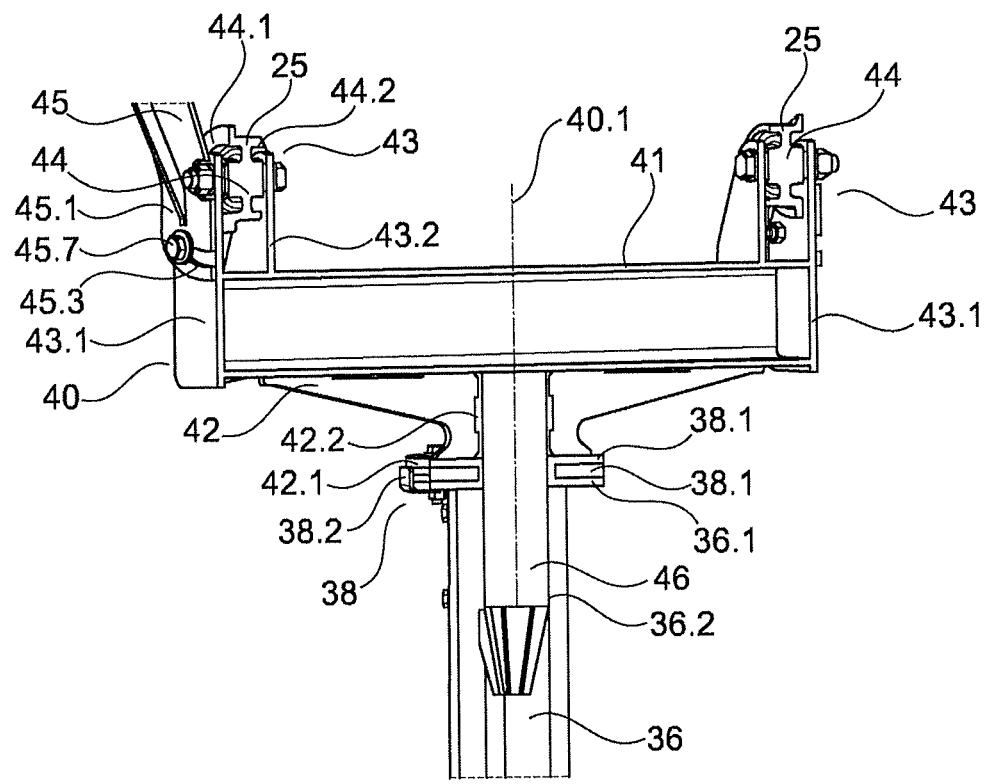
Figure 6:
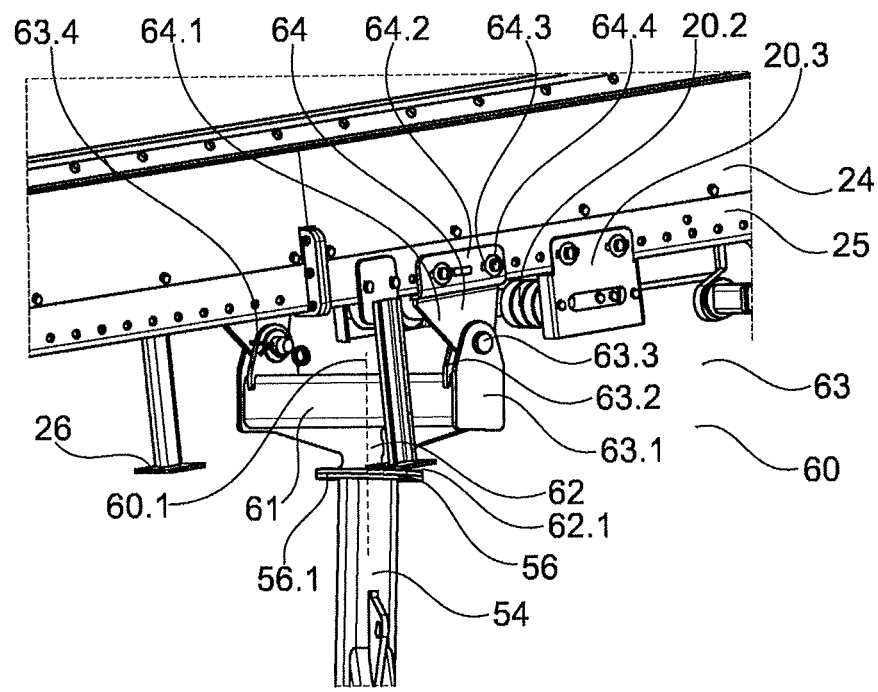
Figure 7:
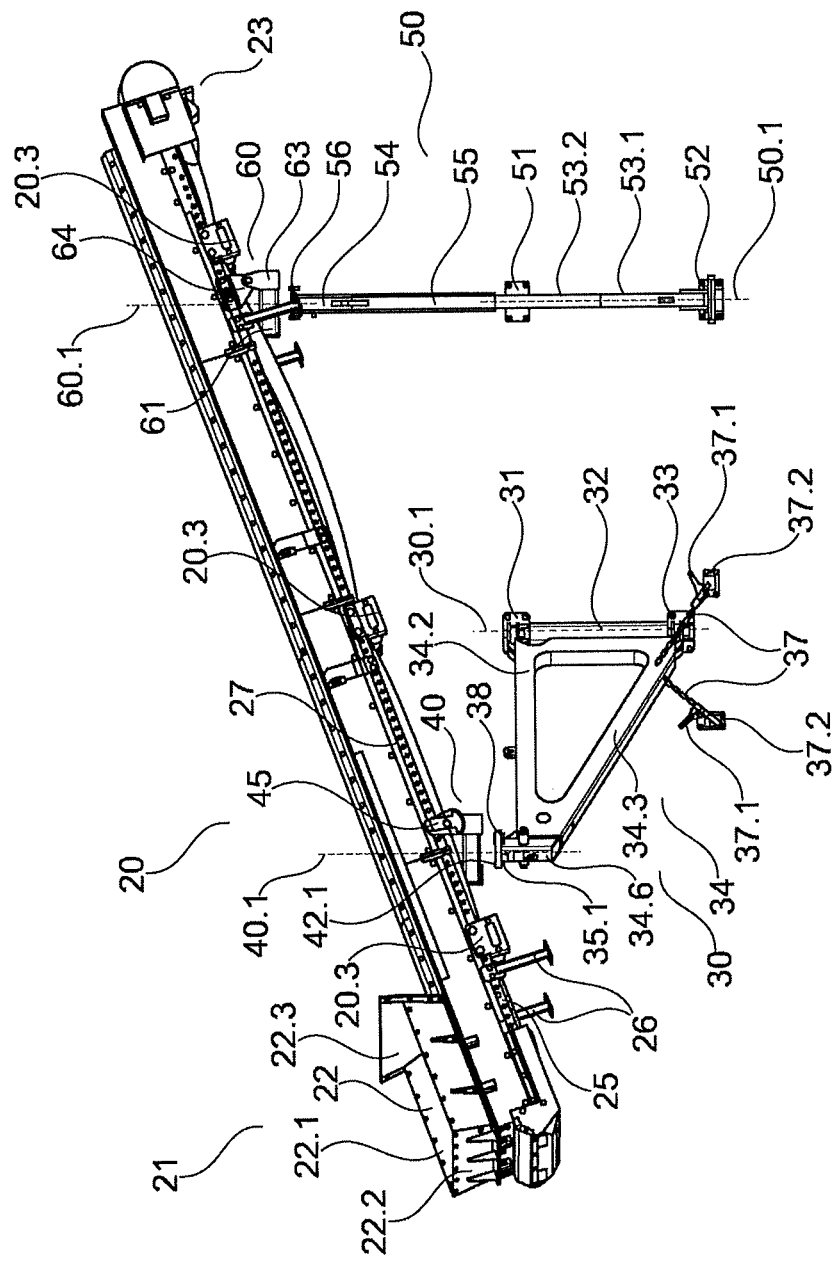
Figure 8:
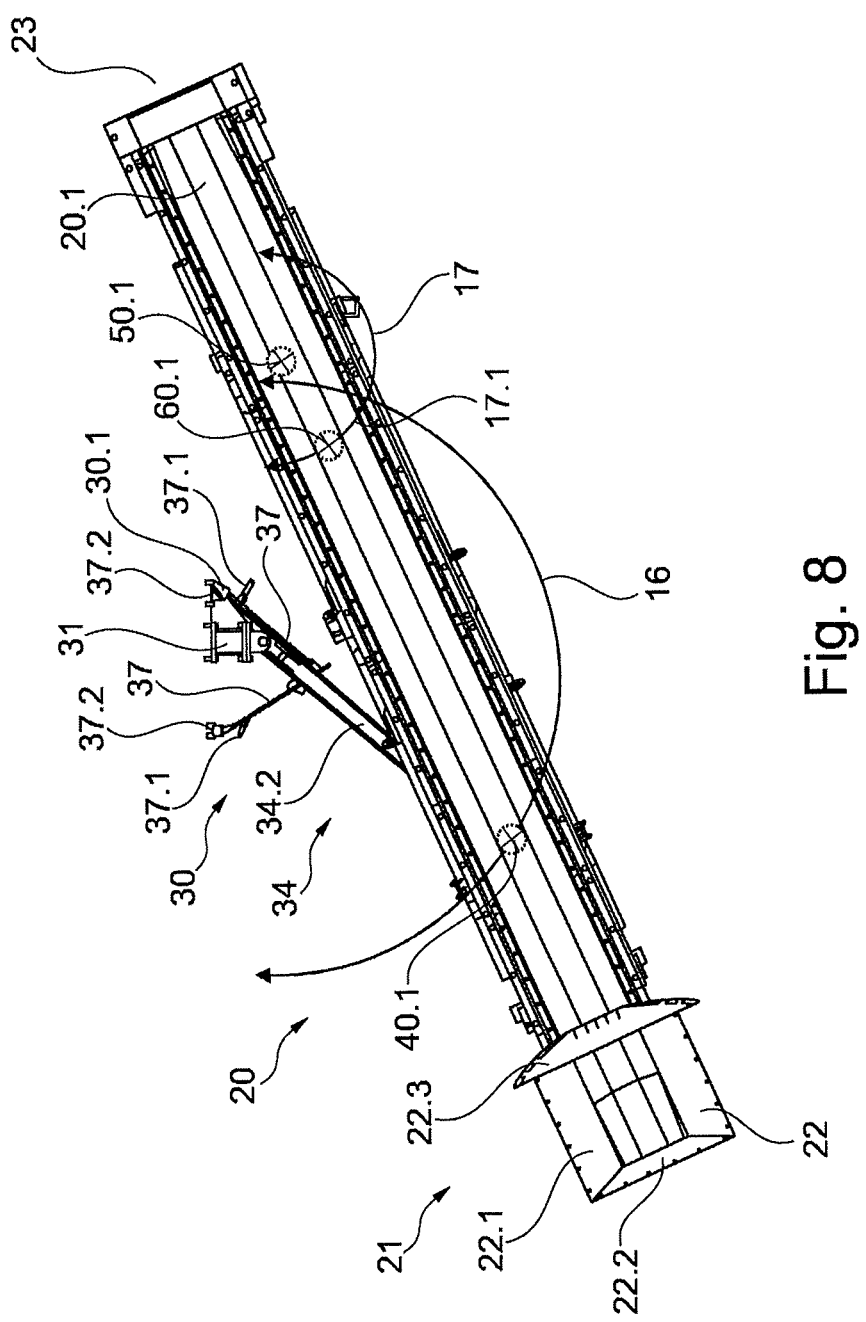
Figure 9:
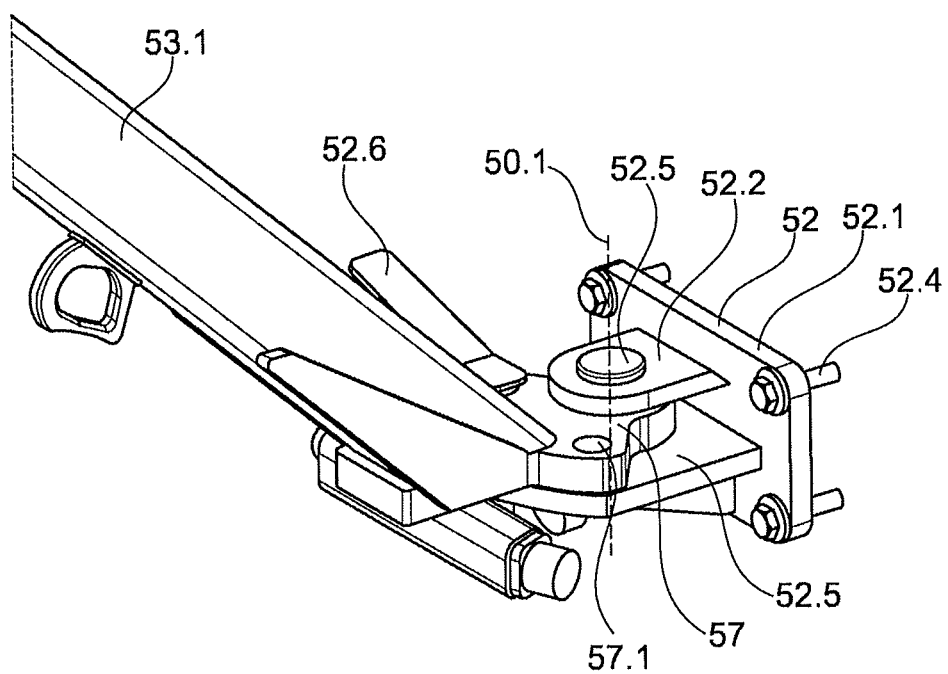
Figure 10:
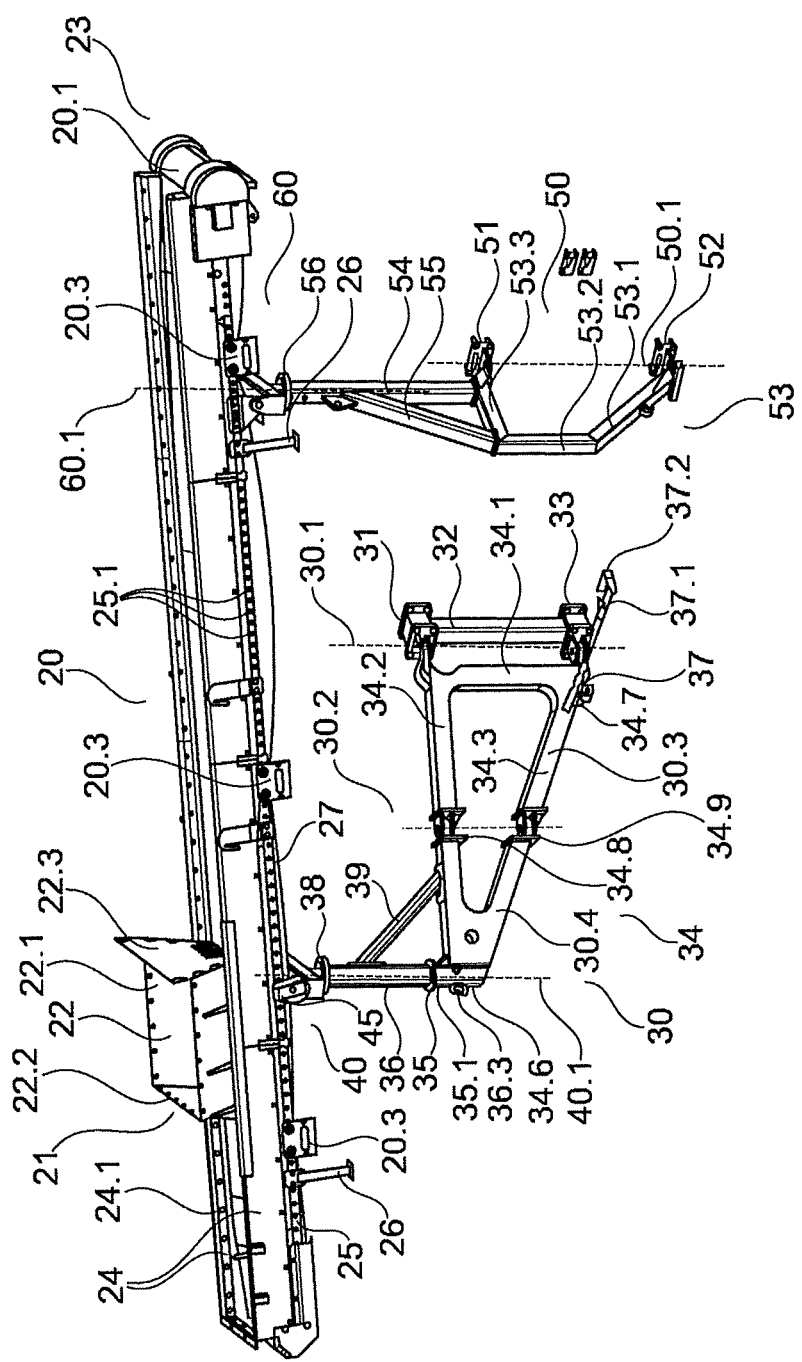

The invention is described in more detail hereinafter with reference to an exemplary embodiment shown in the drawings, in which:

FIG. 1 shows in a perspective view a material processing device with a conveyor belt arrangement, FIG. 2 shows in a perspective view the conveyor belt arrangement with a conveyor belt and two receiving elements in a working position of the conveyor belt, FIG. 3 shows a receiving element on the charging side with a bearing element for the conveyor belt on the charging side, FIG. 4 shows a detailed view of a bearing region of the bearing element shown in FIG. 3 on the charging side, FIG. 5 shows in a perspective sectional view the bearing element on the charging side, FIG. 6 shows in a perspective side view the bearing element on the ejection side with a detail of the conveyor belt, FIG. 7 shows the conveyor belt arrangement shown in FIG. 2 in a more inclined and outwardly pivoted working position of the conveyor belt, FIG. 8 shows in a plan view the conveyor belt arrangement shown in FIG. 2, FIG. 9 shows in a perspective view a fork bearing block for the articulated mounting of a receiving element on a chassis of the material processing device and FIG. 10 shows in a perspective view according to FIG. 2 the conveyor belt arrangement with a compensating mechanism.

FIG. 1 shows in a perspective view a material processing device 10, partially constructed in the present case, with a conveyor belt arrangement. The material processing device 10 may also be referred to as a material processing apparatus. The material processing device 10 has a chassis 11 and is designed to be mobile by means of a tracked drive 12. A conveyor belt 20 of the conveyor belt arrangement is pivotably mounted on the chassis 11 of the material processing device 10 via two receiving elements 30, 50 which in each case bear a bearing element 40, 60. The conveyor belt 20 has in an end portion a charging region 21 and opposingly an ejection region 23. A charging hopper 22 is arranged in the charging region 21. The charging hopper 22 may be positioned and fastened at different positions along the conveyor belt 20. In the partially constructed mounted state of the material processing device 10 shown, a conveyor belt portion 20.1 is not yet fully pulled onto the conveyor belt 20. As a result, obliquely arranged trough rollers 20.2 of the conveyor belt 20, which in the mounted state bear the conveyor belt portion 20.1, may be identified. A tool receiver 13, a charging belt region 14 and a charging hopper region 15 are provided along the chassis 11 of the material processing device 10. A tool for processing the introduced material, for example a crusher for crushing rocks, may be arranged in the region of the tool receiver 13. The rocks are supplied to the crusher via a charging belt which is not yet mounted and therefore not shown. The charging belt is mounted in the charging belt region 14 of the chassis 11. In the case of the fully mounted material processing device 10, a main charging hopper is arranged on the end side and thus in the charging hopper region 15. Via this hopper the material to be processed is supplied to the charging belt which then transports this material to the crusher.

In the working position shown of the conveyor belt arrangement the conveyor belt 20 is arranged such that, when the material processing device 10 is fully mounted, the ejection region 23 is arranged above the main charging hopper. The charging region 21 of the conveyor belt 20 is arranged so as to be located laterally away from the material processing device 10. To this end, the receiving element 30 on the charging side and the receiving element 50 on the ejection side are pivoted away from the chassis 11. In this position, for example, rocks provided by a material processing device, which is not shown and which is connected upstream, for example by means of a further conveyor belt, may be positioned in the charging hopper 22 and thus onto the conveyor belt 20. The conveyor belt 20 transports this material to the main charging hopper which in the present case is not yet mounted. Thus the material reaches the charging belt and from there the crusher.

For the transport of the material processing device 10 the two receiving elements 30, 50 and thus the conveyor belt 20 may be folded onto the chassis 11.

FIG. 2 shows in a perspective view the conveyor belt arrangement with the conveyor belt 20 and the two receiving elements 30, 50 in a working position of the conveyor belt 20. The receiving element 30 on the charging side has a pivoting arm 34 on the charging side. The pivoting arm 34 on the charging side in the present case is formed from a vertical strut 34.1, a horizontal strut 34.2 and an oblique strut 34.3. The struts 34.1 and 34.2, 34.3 are arranged along the outer edges of a triangle and thus form a load-bearing frame structure. The pivoting arm 34 on the charging side is retained on the opposing ends of the vertical strut 34.1 on one respective fork bearing block 31, 33. As a result, a pivot axis 30.1 is formed on the charging side about which the pivoting arm 34 on the charging side is pivotable. The fork bearing blocks 31, 33 encompass a mounting support 32 oriented in the direction of the vertical strut 34.1 and are screwed by means of screw connections to the chassis 11 of the material processing device 10 shown in FIG. 1. On the chassis 11, control element couplings 37.2 laterally spaced apart and opposing the second fork bearing block 33.2 on the chassis side are connected to the chassis 11, in the selected view the front couplings thereof being able to be identified. A chain 37 is guided in each case to the pivoting arm 34 on the charging side, opposing the control element couplings 37.2 on the chassis side and connected thereto by means of corresponding control element couplings 34.7. Ratchet tighteners 37.1 are incorporated into the chains 37. The length of the chains 37 may be altered thereby. By means of the ratchet tighteners 37.1, therefore, the angle about which the pivoting arm 34 on the charging side is folded away from the chassis 11 may be adjusted. At this point it is also conceivable to provide other control units between the chassis 11 and the pivoting arm 34 on the charging side, for example corresponding hydraulic cylinders. It is also conceivable to provide corresponding control devices (chains 37, hydraulic cylinders, etc.) on the receiving element 50 on the ejection side. The control devices may also be referred to as pivoting actuators configured to pivot their associated pivoting arm about its respective pivot axis.

Opposite the pivot axis 30.1 on the charging side, the pivoting arm 34 has a connecting support 34.6. The connecting support 34.6 is arranged on the connection at the end side between the horizontal strut 34.2 and the oblique strut 34.3 of the pivoting arm 34 on the charging side. The connecting support is oriented along its longitudinal extent toward the conveyor belt 20. An intermediate piece 36 is positioned on the connecting support 34.6. The connection between the intermediate piece 36 and the connecting support 34.6 is designed to be easily dismantlable so that the intermediate piece 36 may be easily dismantled. As a result, the inclination of the conveyor belt 20 may be altered, as is described in more detail with reference to FIG. 7. The intermediate piece 36 is connected to the connecting support 34.6 by means of a blocked rotary bearing arrangement 35. To this end, the intermediate piece 36 on the end side and facing the connecting support 34.6 has a lower intermediate piece flange 36.3. This lower intermediate piece flange bears against a lower rotary bearing flange 35.1, which is arranged at the end side and facing the intermediate piece 36 on the connecting support 34.6 and is fixedly connected, preferably screwed, thereto. A supporting strut 39 is provided between the intermediate piece 36 and the horizontal strut 34.2 of the pivoting arm 34 on the charging side. The supporting strut 39 is also able to be connected to the pivoting arm 34 in an easily dismantlable manner and serves for stabilizing the intermediate piece 36.

Opposite the blocked rotary bearing arrangement 35, a rotary bearing connection 38 on the charging side forms a rotatable connection between the intermediate piece 36 and the bearing element 40 positioned thereon on the charging side. This permits a rotation of the bearing element 40 on the charging side relative to the intermediate piece 36 about a rotational axis 40.1 on the charging side. The rotational axis 40.1 on the charging side is oriented in the direction of the longitudinal extent of the intermediate piece 34. The bearing element 40 on the charging side is connected to the conveyor belt 20 in a linearly adjustable manner, as is shown in more detail in FIG. 4. In order to prevent the conveyor belt 20 from lifting up, the bearing element 40 on the charging side has laterally and opposingly two guide brackets 45. These guide brackets encompass in a linearly adjustable manner two guide rails 27 mounted laterally and opposingly on the conveyor belt 20.

In the direction of the ejection region 23 of the conveyor belt 20, said conveyor belt is retained by the receiving element 50 on the ejection side. To this end, a pivoting arm 53 on the ejection side is connected in an articulated manner to the chassis 11, shown in FIG. 1. The pivoting arm 53 on the ejection side is formed from a lower pivoting strut 53.1, a connecting strut 53.2 and an upper pivoting strut 53.3. The lower and the upper pivoting struts 53.1, 53.3 are retained on the end side in an articulated manner by one respective third and fourth fork bearing block 51, 52. The third and fourth fork bearing blocks 51, 52 are connected to the chassis 11, shown in FIG. 1, so as to be aligned with one another. As a result, a pivot axis 50.1 on the ejection side is formed of the pivoting arm 53 on the ejection side. The pivoting arm 53 on the ejection side may be pivoted about the pivot axis 50.1 on the ejection side. The lower pivoting strut 53. 1, starting from the fourth fork bearing block 52, is obliquely oriented facing upwardly. The upper pivoting strut 53.3, starting from the third fork bearing block 51, is oriented transversely to the pivot axis 50.1 on the ejection side. On the end side the lower pivoting strut 53.1 and the upper pivoting strut 53.3 are connected by means of the connecting strut 53.2. The pivoting arm 53 on the ejection side is thus formed by a frame-like strut structure, with two superimposed pivot bearings spaced apart from one another. As a result, a high mechanical load-bearing capacity of the pivoting arm 53 on the ejection side is ensured.

A bearing strut 54 is fastened to the upper pivoting strut 53.3 of the pivoting arm 53. The bearing strut 54 is oriented along its longitudinal extent toward the conveyor belt 20. A transverse strut 55 arranged obliquely thereto is connected at its one end to the upper pivoting strut 53.3 of the pivoting arm 53 and opposingly to the bearing strut 54. As a result, the bearing strut 54 is stabilized. The position of the bearing strut 54 on the upper pivoting strut 53.3 is placed in the direction of the third fork bearing block 51. This results in a relatively small radius on which the bearing strut 54 may be pivoted about the pivot axis 50.1 on the ejection side. At the same time along the upper pivoting strut 53.3 relative to the pivot axis 50.1 on the ejection side a short lever is produced for the mounting position of the bearing strut 54 and a long lever for the position at which the connecting strut 53.2 supports the upper pivoting strut 53.3. By this lever ratio, large forces transmitted by the conveyor belt 20 may be absorbed by the receiving element 50 on the ejection side.

As is shown in more detail in FIG. 6, the bearing element 60 on the ejection side is connected on the end side to the bearing strut 54 via a rotary bearing connection 56 on the ejection side. The rotary bearing connection 56 on the ejection side permits a rotation of the bearing element 60 on the ejection side relative to the bearing strut 54 about a rotational axis 60.1 on the ejection side. The rotational axis 60.1 on the ejection side in this case is oriented in the direction of the longitudinal extent of the bearing strut 54. As is shown further in FIG. 6, the bearing element 60 on the ejection side is fixedly connected to the conveyor belt 20, by means of a holder 63 on the ejection side and a bearing element 64 which is connected rotatably thereto.

The conveyor belt 20 in turn has along its longitudinal extent two lateral guides 24 arranged laterally to the conveyor belt 20.1. Inwardly facing mounting bores 24.1 are incorporated in the lateral guides 24. The charging hopper 22 is formed from two obliquely arranged and opposing side walls 22.1, a rear wall 22.2 and a front wall 42.3 spaced apart from one another. The charging hopper bears against the lateral guides 24 of the conveyor belt 20 and is screwed to the mounting bores 24.1 thereof. The charging hopper 22 may thus be positioned and fixed at different positions along the conveyor belt 20.

Further components are mounted on the conveyor belt 20. To this end, mounting rails 25 are arranged on the lower edges of the lateral guides 24 along the longitudinal extent of the conveyor belt 20. Mounting holes 25.1 are incorporated in the mounting rails 25. Support elements 26 are screwed to the mounting rails 25. The unmounted conveyor belt 20 may be positioned thereon. Retaining elements 20.3 are also fastened to the mounting rails 25. The retaining elements 20.3 guide the conveyor belt portion 20.1 along the lower face of the conveyor belt 20.

The position of the bearing strut 54 on the upper pivoting strut 53.3 defines the radius on which the bearing element 60 on the ejection side may be pivoted about the pivot axis 50.1 on the ejection side. The length of the pivoting arm 34 on the charging side provides the radius on which the bearing element 40 on the charging side may be pivoted about the pivot axis 30.1 on the charging side. In this case the radius on which the bearing element 40 on the charging side may be pivoted about the pivot axis 30.1 on the charging side is selected to be larger than the radius on which the bearing element 60 on the ejection side is pivotable about the pivot axis 50.1 on the ejection side.

FIG. 3 shows the receiving element 30 on the charging side with the bearing element 40 for the conveyor belt 20 on the charging side. The pivoting arm 34 on the charging side has a first bearing plate 34.4 facing the first fork bearing block 31. The first bearing plate 34.4 in this case is arranged at the end of the vertical strut 34.1 facing the horizontal strut 34.2. A second bearing plate 34.5 is arranged at the opposing end of the vertical strut 34.1. The second bearing plate 34.5 is oriented toward the second fork bearing block 33. The first fork bearing block 31 has a first base plate 31.1. First screw receivers 31.4 for fastening the first fork bearing block 31 to the chassis 11 of the material processing device 10 are incorporated in the base plate 31.1. Superimposed and spaced apart from one another, a first upper joint head 31.2 and a first lower joint head 31.3 are fastened to the first base plates 31.1. The first bearing plate 34.4 of the pivoting arm 34 on the charging side is pivotably held between the first upper joint head 31.2 and the first lower joint head 31.3. To this end, the first upper joint head 31.2, the first lower joint head 31.3 and the first bearing plate 34.4 have bores aligned with one another, through which a first joint bolt 31.5 is guided. The second fork bearing block 33 is formed according to the first fork bearing block 33 from a second base plate 33.2 with integrally formed screw receivers 33.4 and a second upper joint head 33.2 and a second lower joint head 33.3. The second bearing plate 34.5 of the pivoting arm 34 on the charging side is held between the second upper joint head 33.2 and the second lower joint head 33.3 and connected in an articulated manner thereto by means of a second joint bolt 33.5. The pivot axis 30.1 on the charging side of the pivoting arm 34 on the charging side is formed by the first and second joint bolts 31.5, 33.5 aligned with one another.

The supporting strut 39 is fastened by means of an upper connecting flange 39.1 to the intermediate piece 36 and by means of a lower connecting flange 39.2 to the horizontal strut 34.2 of the pivoting arm 34.

The bearing element 40 on the charging side is rotatably positioned onto the intermediate piece 36 by means of the rotary bearing connection 38 on the charging side about the rotational axis 40.1 on the charging side. The bearing element 40 on the charging side has a crossmember 41. The crossmember 41 is oriented transversely to the rotational axis 40.1 on the charging side. Facing the intermediate piece 36 a supporting element 42 is connected to the crossmember 41, via which the crossmember 41 is connected to the rotary bearing connection 38 on the charging side. At the end side the holders 43 are arranged on the crossmember 41. The holders 43 in each case are formed from an outer retaining plate 43.1 and an inner retaining plate 43.2. These retaining plates are arranged laterally spaced apart from one another in the respective end regions of the crossmember 41. In each case, a guide roller 44 is rotatably mounted between the retaining plates 43.1, 43.2.

FIG. 4 shows a detailed view of a bearing region of the bearing element 40 shown in FIG. 3 on the charging side. The mounting rail 25 is arranged along the lower edge of the lateral guide 24 shown of the conveyor belt 20. The guide rail 27 is screwed with corresponding mounting screws 27.1 to the mounting rail 25. At the end side the outer retaining plate 43.1 is fastened to the crossmember 41 of the bearing element 40 on the charging side. Spaced apart from the outer retaining plate 43.1, the inner retaining plate 43.2 is connected to the crossmember 41. The guide roller 44 is rotatably held between the outer retaining plate 43.1 and the inner retaining plate 43.2. To this end, a corresponding axle screw 43.4 is guided through bores of the retaining plates 43.1, 43.2, which are arranged so as to be aligned, as well as the hub of the guide roller 44. The guide roller 44 has a running surface 44.2 and a flange 44.1 connected thereto laterally toward the outside. The conveyor belt 20 with its mounting rail 25 is positioned on the running surface 44.2 of the guide roller 44. The conveyor belt 20 is guided laterally through the flange 44.1. The guide bracket 45 is fastened to the outer retaining plate 43.1. In this case the guide bracket is pivotably mounted about the rotational axis of the guide roller 44. The guide bracket 45 has a flange portion 45.1 with a bore 45.2 through which the axle screw 43.4 is inserted. The flange portion 45.1 transitions into an obliquely outwardly extending central portion 45.4 of the guide bracket 45. A guide portion 45.6 is integrally formed at the end side on the central portion 45.4, which is bent back in the direction of the mounting rail 25 of the conveyor belt 20. Starting from the flange portion 45.1 two reinforcing projections 45.5 are connected to the central portion 45.4 and the guide portion 45.6. A slot 45.3 which is configured in an arcuate manner about the rotational axis of the guide roller 44 is integrally formed in the flange portion 45.3. The outer retaining plate 43.1 has fixing bores 43.3 in the region of the slot 45.3. Screws, not shown, may be screwed into these bores and thus the rotational angle of the guide bracket 45 fixed.

The guide bracket 45 encompasses the guide rail 27 with its guide portion 45.6. The guide bracket is adapted in terms of its angle to the inclination of the conveyor belt 20, and in this rotational position fixed by a screw 45.7, shown in FIG. 5, to the outer retaining plate 43.1. Opposite the guide portion 45.6 the lower edge of the mounting rail 25 is positioned on the running surface 44.2 of the guide roller 44. The mounting rail 25 bears outwardly against the flange 44.1 of the guide roller 44. At the opposing end of the crossmember 41, mirror-symmetrically a similar holder 43 is provided with a guide roller 44 and a guide bracket 45. Also opposingly, a guide rail 27 is screwed to the mounting rail 25 at that point. The conveyor belt 20 is thus mounted on both sides on the guide rollers 44 by the bearing element 40 on the charging side, guided laterally by the flanges 44.1 of the guide rollers 44 and secured by the cooperation of the guide brackets 45 and the guide rails 27 against being lifted up. In this case, the bearing of the conveyor belt 20 on the guide rollers 44 permits a simple linear adjustment of the conveyor belt 20 relative to the bearing element 40 on the charging side.

FIG. 5 shows in a perspective sectional view the bearing element 40 on the charging side. In this case, the section is positioned along the longitudinal extent of the crossmember 41 and the intermediate piece 36.

The conveyor belt 20 is mounted in a linearly movable manner with its mounting rails 25 on the guide rollers 44. The guide rollers 44 are rotatably mounted by means of the axle screws 43.4 between the respective outer and inner retaining plates 43.1, 43.2 of the holders 43.

The crossmember 41 is positioned on the supporting element 42 and is connected thereto. The intermediate piece 36 has a rotary bearing flange 36.1 toward the supporting element 42. Opposingly, a rotary bearing counter flange 42.1 is arranged on the supporting element 42. Two sliding discs 38.1 are arranged superimposed between the rotary bearing flange 36.1 and the rotary bearing counter flange 42.1. The sliding discs 38.1 are laterally guided on their periphery by guide tabs 38.2. The guide tabs 38.2 are connected to the rotary bearing flange 36.1 of the intermediate piece 36. A bolt holder 42.2 is provided in the supporting element 42. The bolt holder 42.2 is designed as a bore guided from the crossmember 41 to the rotary bearing counter flange 42.1. Opposing the bolt holder 42.2 a rotary bolt receiver 36.2 is incorporated into the intermediate piece 36. The rotary bolt receiver 36.2 is designed as a bore extending in the direction of the longitudinal extent of the intermediate piece 36. A rotary bearing bolt 46 is inserted into the rotary bolt receiver 36.2 of the intermediate piece 36 and the bolt holder 42.2 of the supporting element 42. The rotary bearing bolt 46 is rotatably mounted in the rotary bolt receiver 36.2 and/or the bolt holder 42.2 The rotary bearing connection 38 on the charging side between the intermediate piece 36 and the bearing element 40 on the charging side is formed by the sliding surface configured between the sliding discs 38.1 and the rotatable mounting of the rotary bearing bolt 46. In this case, by the rotary bearing bolt 46 a high mechanical load-bearing capacity of the rotary bearing connection 38 on the charging side is ensured relative to forces acting transversely to the rotational axis 40.1 on the charging side onto the bearing element 40 on the charging side. The effect of the rotary bearing flange 36.1 and the rotary bearing counter flange 42.1 is that large forces acting in the direction of the rotational axis 40.1 on the charging side, as for example are produced by the weight force of the conveyor belt 20 and the material transported thereon, may also be reliably diverted from the bearing element 40 on the charging side to the intermediate piece 36 and from there via the pivoting arm 34 on the charging side to the chassis 11 of the material processing device 10. The sliding discs 38.1 ensure in this case low friction and, as a result, easy rotatability of the bearing element 40 on the charging side about the rotational axis 40.1 on the charging side.

FIG. 6 shows in a perspective side view the bearing element 60 on the ejection side with a detail of the conveyor belt 20. The bearing element 60 on the ejection side has a crossmember 61 on the ejection side. This crossmember is oriented transversely to the rotational axis 60.1 on the ejection side and to the conveyor belt 60. The crossmember 61 on the ejection side is mounted on a supporting element 62 on the ejection side. This supporting element has a rotary bearing counter flange 62.1 on the ejection side which is arranged opposite a rotary bearing flange 56.1 on the ejection side of the bearing strut 54. It is conceivable to provide sliding discs 38.1 between the rotary bearing flange 56.1 on the ejection side and the rotary bearing counter flange 61.1 on the ejection side, as are shown in FIG. 5 for the bearing element 40 on the charging side. In each case spaced apart from one another, an outer retaining plate 63.1 on the ejection side and an inner retaining plate 63.2 on the ejection side are connected to the crossmember 61 on the ejection side at the opposing ends of the crossmember 61 on the ejection side. The bearing element 60 on the ejection side is thus configured corresponding to the bearing element 40 on the charging side as, in particular, is described with reference to FIGS. 3 and 5. The rotary bearing connection 56 on the ejection side provided between the bearing element 60 on the ejection side and the bearing strut 54 is preferably constructed corresponding to the rotary bearing connection 38 on the charging side, which is described corresponding to FIG. 5. Differing from the bearing element 40 on the charging side, the bearing element 60 on the ejection side has no guide rollers 44. In each case a bearing portion 64.1 of a bearing element 64 is arranged between the outer and inner retaining plates 63.1, 63.2 on the ejection side. A mounting portion 64.2 is integrally formed on the bearing portion 64.1. Mounting recesses 64.3 are integrally formed in the mounting portion 64.2. The bearing element 64 is screwed by means of fastening screws 64.4, which are guided through the mounting recesses 64.3, onto the mounting rail 25 of the conveyor belt 20. In each case, a joint bolt 63.3 connects the opposingly arranged bearing elements 64 in an articulated manner to the associated holders 63 on the ejection side. The joint bolts 63.3 are axially secured by means of securing split pins 63.4.

The conveyor belt 20 is thus connected in an articulated manner, but retained in a linear manner, on the bearing element 60 on the ejection side. The conveyor belt may be pivoted about the axis formed by the joint bolts 63.3 and about the rotational axis 60.1 on the ejection side formed by the rotary bearing connection 56.1 on the ejection side. The axis formed by the joint bolts 63.3 and the rotational axis 60.1 on the ejection side are located transversely, preferably perpendicularly, to one another. Thus both the inclination of the conveyor belt 20 and the orientation thereof may be adjusted.

FIG. 7 shows the conveyor belt arrangement shown in FIG. 2 in a more inclined working position of the conveyor belt 20 pivoted further outwardly. To this end, the receiving elements 30, 50 are folded away again from the chassis 11 of the material processing device 10. Moreover, the intermediate piece 36 shown in FIG. 2 and the associated supporting strut 39 are dismantled. The bearing element 40 on the charging side is directly mounted on the connecting support 34.6 of the pivoting arm 34 on the charging side. As a result, the rotary bearing connection 38 on the charging side is configured between the bearing element 40 on the charging side and the connecting support 34.6. Preferably, the connecting support 34.6 has a receiver for a rotary pin, as is shown in FIG. 5 for the intermediate piece 36. For forming the rotary bearing connection 38 on the charging side, a rotary bearing pin 46, as shown in FIG. 5, is arranged in the bolt holder 42.2 of the supporting element 42, shown in FIG. 5, of the bearing element 40 on the charging side and the receiver for the rotary pin in the connecting support 34.6. It is also conceivable here to arrange sliding discs 38 between the lower rotary bearing flange 35.1 of the connecting support 34.6 and the rotary bearing counter flange 42.1 of the bearing element 40 on the charging side, in order to obtain a freely moving rotational connection between the pivoting arm 34 on the charging side and the receiving element 30 on the charging side. Thus the rotary bearing connection 38 on the charging side, which is configured between the bearing element 40 on the charging side and the connecting support 34.6, is of the same construction as the rotary bearing connection 38 on the charging side shown in FIG. 5 between the bearing element 40 on the charging side and the intermediate piece 36. The intermediate piece 36 may, therefore, be easily removed and the bearing element 40 on the charging side rotatably connected to the connecting support 34.6. In this case, the position and the orientation of the rotational axis 40.1 on the charging side are obtained relative to the pivoting arm 34 on the charging side.

By the removal or the installation of the intermediate piece 36, the inclination of the conveyor belt 20 may be altered. As a result, both the working height of the charging region 21 and that of the ejection region 23 may be altered. It is conceivable to arrange a linear actuator between the pivoting arm 34 on the charging side and the bearing element 40 on the charging side instead of the intermediate piece 36. Such a linear actuator, for example in the form of a hydraulic cylinder, permits a continuous adjustment of the inclination of the conveyor belt 20. It is also conceivable to provide intermediate pieces 36 of different lengths and as required between the connecting support 34.6 and the bearing element 40 on the charging side.

By the adjustment of the inclination of the conveyor belt 20 is is necessary to adapt the orientation of the guide brackets 45 to the inclination of the guide rail 27. To this end, the screw 45.7, shown in FIG. 5, by which the rotation of the guide brackets 45 is blocked relative to the holder 43, is released and the guide brackets 45 correspondingly adjusted.

FIG. 8 shows in a plan view the conveyor belt arrangement shown in FIG. 2, in a working position. The receiving element 30 on the charging side is pivoted away by means of the chains 37, which are adjustable in their length, from the chassis 11 of the material processing device 10, shown in FIG. 1. The receiving element 50 on the ejection side is also pivoted away from the chassis 11. In this case, the receiving element 50 on the ejection side is concealed by the bearing element 60 on the ejection side from the conveyor belt 20 arranged thereabove.

A pivoting region 16, 17 of the conveyor belt on the charging side and on the ejection side in each case is marked by a double arrow. In this case, the pivoting region 16 on the charging side may be provided by the radius on which the rotational axis 40.1 on the charging side of the supporting element 40 on the charging side may be pivoted about the pivot axis 30.1 on the charging side of the receiving element 30 on the charging side. Correspondingly, the pivoting region 17 on the ejection side extends along the radius on which the rotational axis 60.1 on the ejection side of the supporting element 60 on the ejection side may be pivoted about the pivot axis 50.1 on the ejection side of the receiving element 50 on the ejection side. The pivot radius on the charging side is selected to be greater than the pivot radius on the ejection side. As a result, the charging region 21 of the conveyor belt may be folded away from the material processing device 10, whilst the ejection region 23 is guided above the material processing device 10 and at that point above the desired ejection point.

In order to achieve an adjustment, which is as large as possible, of the conveyor belt 20 with a pivoting of the receiving element 30, 50, it is advantageous if the pivoting arms 34, 53 are oriented approximately in the direction of the conveyor belt 20 and as far as possible not transversely to the conveyor belt 20, as shown in the selected view by the pivoting arm 34 on the charging side. With such an orientation of the pivoting arms 34, 53, a relatively small angular alteration of a receiving element 30, 50 effects a large positional alteration of the conveyor belt 20. Thus in each case a preferred pivoting region 17.1 of the receiving elements 30, 50 to one another relative to the conveyor belt 20 results, as is shown by a corresponding double arrow for the receiving element 30 on the ejection side.

FIG. 9 shows in a perspective view a fork bearing block (fourth fork bearing block 52) for the articulated mounting of a receiving element 30, 50 on the chassis 11 of the material processing device 10.

The fourth fork bearing block 52 has a fourth base plate 52. This base plate is screwed by means of four mounting screws 52.4 to the chassis 11, shown in FIG. 1, of the material processing device 10. Two joint heads 52.2, 52.3 spaced apart from one another are attached to the base plate 52. A fourth bearing plate 57 is arranged between the joint heads 52.2, 52.3. The fourth bearing plate 57 is connected in an articulated manner to the joint heads 52.2, 52.3 by means of a fourth joint bolt 52.5. In this case, the central line of the fourth joint bolt 52.5 forms the pivot axis 50.1 on the ejection side of the receiving element 50 on the ejection side. Opposingly, the fourth bearing plate 57 is connected to the lower pivoting strut 53.1 of the pivoting arm 53 on the ejection side. The fourth lower joint head 52.3 has a larger surface area than the fourth upper joint head 52.2 and correspondingly protrudes thereover. In the projecting region, blocking bores 57.1 are integrally formed in the fourth bearing plate 57 and the fourth lower joint head 52.3. A blocking bolt 52.6 is inserted through two blocking bores 57.1, which are arranged so as to be aligned with one another, of the fourth lower joint head 52.3 and the fourth bearing plate 57. As a result, the pivoting movement of the receiving element 50 on the ejection side is blocked around the pivot axis 50.1 on the ejection side.

Preferably, both in the case of the receiving element 30, 50 on the charging side and on the ejection side, a fork bearing block 31, 33, 51, 52 is designed to be blockable.

The function of the conveyor belt arrangement is described hereinafter with reference to FIGS. 1 to 9. For transport of the material processing device 10, the conveyor belt 20 is folded onto the chassis 11 of the material processing device 10 and blocked there. For adjusting the working position of the conveyor belt initially the blocking is released. Subsequently, the receiving element 30 on the charging side and the receiving element 50 on the ejection side are folded away from the chassis 11. This takes place in the present case by means of the chain 37 which is adjustable in its length. By the pivoting of the receiving element 37 on the charging side about the pivot axis 30.1 on the charging side, the charging region 21 of the conveyor belt 20 is pivoted from the material processing device 10 into the desired direction. By the pivoting of the receiving element on the ejection side about the pivot axis 50.1 on the ejection side, the ejection region 23 of the conveyor belt 20 above the material processing device 10 is adjusted. If the desired working position of the conveyor belt 20 is reached, this is blocked by blocking bolts 52.6 on at least one fork bearing block 31, 33, 51, 52 of the receiving elements 30, 50.

If it is required to alter the inclination of the conveyor belt 20, for example in order to arrange the charging region 21 or the ejection region higher or lower, the intermediate piece 36 is installed and/or dismantled with the associated supporting strut 39. Advantageously, the bearing element 40 on the charging side may be rotatably connected both to the intermediate piece 36 and also to the connecting support 34.6. In order to avoid jamming of the guide bracket 45 on the guide rail 27, the orientation thereof is adjustable. The guide bracket 45 may in this case be adjusted such that the guide portion 45.6 thereof has the same inclination as the guide rail 27.

When folding the conveyor belt 20 outwardly and inwardly, the receiving elements 30, 50 may be adjusted at different angles relative to the chassis 11. This results in an alteration to the spacing between the two bearing elements 40, 60. In order to be able to compensate for this, the bearing element 40 on the charging side is connected to the conveyor belt 20 in a linearly adjustable manner. It is also conceivable, however, that the bearing element 60 on the ejection side, or both bearing elements 40, 60, are connected in a linearly movable manner to the conveyor belt 20.

When pivoting the receiving elements 30, 50, the angle of the receiving elements 30, 50 is altered relative to the conveyor belt 20. In order to compensate for this, the bearing elements 40, 60 are rotatably mounted about the respective rotational axes 40.1, 60.1, relative to the associated pivoting arms 34, 53.

The essential advantage of the conveyor belt arrangement according to the invention is that the angle and the ejection region 23 of the conveyor belt 20 relative to the material processing device 10 may be adjusted via the angular alteration of the receiving elements 30, 50. As a result, firstly the charging region 21 of the conveyor belt 20 may be adjusted to a system connected upstream. Secondly, the ejection region 23 of the conveyor belt 20 may be adjusted relative to the material processing device 10. If, for example, it is provided that the conveyor belt 20 transports material onto a main charging hopper of the material processing device 10 it is necessary to charge the material as evenly as possible into the main charging hopper. Charging on one side has the drawback that a crusher arranged downstream is loaded unevenly. This may be achieved by the accurate orientation of the conveyor belt 20 relative to the main charging hopper.

For optimal adjustment of the conveyor belt 20, it is advantageous if the pivoting regions 15, 16 are selected to be as large as possible. It is also advantageous if the pivoting arms 34, 53 are oriented approximately in the direction of the conveyor belt 20 and as far as possible not transversely to the conveyor belt 20. With such an orientation of the pivoting arms 34, 53, a relatively small angular alteration of a receiving element 30, 50 effects a large positional alteration of the conveyor belt 20.

FIG. 10 shows in a perspective view corresponding to FIG. 2 the conveyor belt arrangement with a compensating mechanism. The same components and subassemblies are denoted the same as according to FIG. 2. For unchanged components and subassemblies, reference is accordingly made to the above description.

Differing from the variant according to FIG. 2, the arrangement according to FIG. 3 has an additional compensating mechanism on the receiving element 30 on the charging side. The compensating mechanism is formed by a compensating joint connection between a portion 30.3 facing the pivot bearing of the receiving element 30 on the charging side and a portion 30.4 of the receiving element 30 on the charging side, remote from the pivot bearing. The compensating joint connection is formed by two compensating joints 34.8, 34.9 which are arranged so as to be aligned with one another. In this case, the first compensating joint 34.8 is arranged in the horizontal strut 34.2 and the second compensating joint 34.9 is arranged in the oblique strut 34.3 of the pivoting arm 34 on the charging side. The compensating joints 34.8, 34.9 form a compensating pivot axis 30.2. The portion 30.4 remote from the pivot bearing of the receiving element 30 on the charging side may be pivoted relative to the portion 30.3 facing the pivot bearing about the compensating pivot axis 30.2. As a result, the spacing between the pivot axis 30.1 on the charging side and the connecting support 34.6 and/or rotational axis 40.1 on the charging side and/or bearing element 40 on the charging side is altered. By pivoting-in the portion 30.4 remote from the pivot bearing about the compensating pivot axis 30.2, therefore, the spacing between the two bearing elements 40, 60 may be altered, whereby the pivoting of the receiving elements 30, 50 is permitted independently of one another. In the present case, the bearing element 40 on the charging side is also connected in a linearly movable manner to the conveyor belt 20. With the presence of the compensating mechanism according to the invention it is also conceivable to connect the bearing element 40 on the charging side fixedly to the conveyor belt 20, as is shown for the bearing element 60 on the ejection side. The compensation of the spacing alteration between the two bearing elements 40, 60 is thus carried out exclusively via the compensating mechanism.

The invention claimed is:

1. A material processing apparatus, comprising:
a chassis;
a conveyor belt including a charging region and an ejection region;
a first pivoting arm pivotably mounted relative to the chassis to pivot about a first pivot axis;
a second pivoting arm pivotably mounted relative to the chassis to pivot about a second pivot axis;
a first bearing element rotatably mounted on the first pivoting arm to rotate about a first rotational axis;
a second bearing element rotatably mounted on the second pivoting arm to rotate about a second rotational axis;
wherein the conveyor belt is mounted on the first and second bearing elements such that the conveyor belt is movable relative to the chassis between a working position and a transport position by pivoting of the first and second pivoting arms; and
wherein at least one of the first and second bearing elements includes a linearly adjustable connection of the at least one of the first and second bearing elements to the conveyor belt along a length of the conveyor belt.

2. The material processing apparatus of claim 1, wherein:
at least one of the first and second bearing elements includes a lengthwise fixed connection to the conveyor belt, the lengthwise fixed connection being fixed along the length of the conveyor belt.

3. The material processing apparatus of claim 1, wherein:
the first bearing element is closer to the charging region of the conveyor belt than is the second bearing element;
the second bearing element is closer to the ejection region of the conveyor belt than is the first bearing element; and
the first bearing element is mounted on the first pivoting arm at a first radius from the first pivotal axis, and the second bearing element is mounted on the second pivoting arm at a second radius from the second pivotal axis, the first radius being larger than the second radius.

4. The material processing apparatus of claim 1, wherein:
the one of the first and second bearing elements including the linearly adjustable connection to the conveyor belt includes guide rollers facing the conveyor belt, the conveyor belt being mounted on the guide rollers.

5. The material processing apparatus of claim 4, wherein:
the guide rollers include running surfaces, the conveyor belt being mounted on the running surfaces.

6. The material processing apparatus of claim 4, wherein:
the guide rollers include flanges, the conveyor belt being laterally guided by the flanges.

7. The material processing apparatus of claim 1, wherein:
the conveyor belt includes laterally opposed guide rails; and
the one of the first and second bearing elements including the linearly adjustable connection to the conveyor belt includes guide brackets at least partially encompassing the guide rails.

8. The material processing apparatus of claim 7, wherein:
the guide rails define a longitudinal extent of the guide rails; and
the guide brackets are mounted on the one of the first and second bearing elements including the linearly adjustable connection to the conveyor belt at an adjustable angle about an axis extending transversely to the longitudinal extent of the guide rails.

9. The material processing apparatus of claim 1, wherein:
at least one of the first and second bearing elements includes a lengthwise fixed connection to the conveyor belt, the lengthwise fixed connection being fixed along the length of the conveyor belt; and
the at least one of the first and second bearing elements including the lengthwise fixed connection is also pivotably connected to the conveyor belt about an axis extending transversely to the rotational axis of the respective bearing element.

10. The material processing apparatus of claim 1, wherein:
the first and second bearing elements are rotatably mounted on the first and second pivoting arms, respectively, via first and second plain bearings, respectively.

11. The material processing apparatus of claim 1, wherein:
the first and second bearing elements are rotatably mounted on the first and second pivoting arms, respectively, via superimposed sliding disks.

12. The material processing apparatus of claim 1, wherein:
at least one of the first and second bearing elements is adjustably supported from its associated pivoting arm such that a spacing of the bearing element relative to its associated pivoting arm is adjustable.

13. The material processing apparatus of claim 12, wherein:
the spacing of the bearing element relative to its associated pivoting arm is adjustable by installing and dismantling at least one intermediate piece of the associated pivoting arm.

14. The material processing apparatus of claim 13, wherein:
when the intermediate piece is installed, a rotary bearing connection of the bearing element is located between the bearing element and the intermediate piece; and
when the intermediate piece is dismantled, the rotary bearing connection of the bearing element is located between the bearing element and the associated pivoting arm.

15. The material processing apparatus of claim 12, wherein:
the spacing of the bearing element relative to its associated pivoting arm is adjustable via at least one actuator.

16. The material processing apparatus of claim 1, further comprising:
at least one pivoting actuator associated with at least one of the pivoting arms, the pivoting actuator being configured to pivot the associated pivoting arm about its respective pivot axis.

17. The material processing apparatus of claim 16, wherein the pivoting actuator is selected from the group consisting of:
a linear actuator;
an adjustable length chain;
an adjustable length cable; and
an adjustable length rod.

18. The material processing apparatus of claim 1, wherein:
the first rotational axis is parallel to the first pivot axis; and the second rotational axis is parallel to the second pivot axis.

19. The material processing apparatus of claim 1, wherein:
at least one of the first and second pivoting arms is pivotably mounted relative to the chassis in a manner such that pivoting movement of the at least one of the first and second pivoting arms relative to the chassis can be blocked.

20. The material processing apparatus of claim 1, wherein:
the first bearing element is closer to the charging region of the conveyor belt than is the second bearing element; and
the at least one of the first and second bearing elements including the linearly adjustable connection is the first bearing element.

21. The material processing apparatus of claim 1, wherein:
the first bearing element is closer to the charging region of the conveyor belt than is the second bearing element; and
a vertical spacing between the first bearing element and the first pivoting arm is adjustable.

22. The material processing apparatus of claim 1, wherein:
at least one of the first and second pivoting arms includes a compensating joint connection between first and second portions of the pivoting arm, such that the first portion may be pivoted relative to the second portion, the compensating joint connection being remote from the respective pivot axis of the at least one of the first and second pivoting arms.

23. The material processing apparatus of claim 1, wherein:
the linearly adjustable connection is configured such that the linearly adjustable connection is able to be blocked.

24. A material processing apparatus, comprising:
a chassis;
a conveyor belt including a charging region and an ejection region;
a first pivoting arm pivotably mounted relative to the chassis to pivot about a first pivot axis;
a second pivoting arm pivotably mounted relative to the chassis to pivot about a second pivot axis;
a first bearing element rotatably mounted on the first pivoting arm to rotate about a first rotational axis;
a second bearing element rotatably mounted on the second pivoting arm to rotate about a second rotational axis;
wherein the conveyor belt is mounted on the first and second bearing elements such that the conveyor belt is movable relative to the chassis between a working position and a transport position by pivoting of the first and second pivoting arms; and
wherein at least one of the first and second pivoting arms includes a compensating joint connection between first and second portions of the pivoting arm, such that the first portion may be pivoted about a compensating pivot axis relative to the second portion, the compensating joint connection being remote from the respective pivot axis relative to the chassis of the at least one of the first and second pivoting arms.

25. The material processing apparatus of claim 24, wherein:
the compensating pivot axis is parallel to the respective pivot axis relative to the chassis of the at least one of the first and second pivoting arms.

* * * * *